US012591140B2

(12) United States Patent
Sizov et al.

(10) Patent No.: US 12,591,140 B2
(45) Date of Patent: Mar. 31, 2026

(54) OPTICAL SYSTEMS WITH COLOR FILTERS FOR EMISSIVE DISPLAYS

(71) Applicant: Apple Inc., Cupertino, CA (US)

(72) Inventors: Dmitry S. Sizov, San Jose, CA (US); Xiaobin Xin, Campbell, CA (US); Hyungryul Choi, San Jose, CA (US); Vikrant Bhakta, Santa Clara, CA (US); Fang Ou, San Diego, CA (US); Lina He, San Jose, CA (US); Sergei Y. Yakovenko, Pine Grove, CA (US); Ranojoy Bose, Fremont, CA (US); Paul S. Drzaic, Morgan Hill, CA (US)

( * ) Notice: Subject to any disclaimer, the term of this patent is extended or adjusted under 35 U.S.C. 154(b) by 424 days.

(21) Appl. No.: 18/173,579

(22) Filed: Feb. 23, 2023

(65) Prior Publication Data

US 2023/0324689 A1 Oct. 12, 2023

Related U.S. Application Data

(63) Continuation of application No. PCT/US2021/049311, filed on Sep. 7, 2021.

(Continued)

(51) Int. Cl.
*G02B 27/01* (2006.01)
*F21V 8/00* (2006.01)

(52) U.S. Cl.
CPC ....... *G02B 27/0172* (2013.01); *G02B 6/0031* (2013.01); *G02B 6/0073* (2013.01);

(Continued)

(58) Field of Classification Search
CPC .............. G02B 27/0172; G02B 6/0031; G02B 6/0073; G02B 2027/0112;

(Continued)

(56) References Cited

U.S. PATENT DOCUMENTS 11,669,161 B2 * 6/2023 Jones ................. G02B 27/0176
345/156
2006/0250696 A1 11/2006 McGuire
(Continued)

FOREIGN PATENT DOCUMENTS

CN 103119514 A 5/2013
EP 3546991 A1 10/2019
(Continued)

OTHER PUBLICATIONS

Tingzhu Wu et al., Mini-LED and Micro-LED: Promising Candidates for the Next Generation Display Technology, Applied Sciences, Sep. 2018, pp. 1-17, vol. 8, No. 9, MDPI.

*Primary Examiner* — Collin X Beatty
(74) *Attorney, Agent, or Firm* — Treyz Law Group, P.C.; Michael H. Lyons; Jinie M. Guihan

(57) ABSTRACT

An electronic device may provide image light to an eye box. The display may include a light source panel that emits the image light. A waveguide may direct the image light towards the eye box. An input coupler may couple the image light into the waveguide and an output coupler may couple the image light out of the waveguide. A color filter may be optically interposed between the light source panel and the output coupler. The color filter may filter the image light using a steep cutoff characteristic. The color filter may allow the image light to exhibit a desired color point while also allowing the light source panel to use light emitters having peak emission wavelengths that maximize the efficiency of the light emitters and thus the power efficiency of the device.

17 Claims, 10 Drawing Sheets

Related U.S. Application Data

(60) Provisional application No. 63/077,424, filed on Sep. 11, 2020.

(52) U.S. Cl.
CPC ................. *G02B 2027/0112* (2013.01); *G02B 2027/0174* (2013.01)

(58) Field of Classification Search
CPC .... G02B 2027/0174; G02B 2027/0114; G02B 27/149
See application file for complete search history.

(56) References Cited

U.S. PATENT DOCUMENTS

| | | | | |
|---|---|---|---|---|
| 2014/0111865 A1* | 4/2014 | Kobayashi | ......... | G02B 27/0172 |
| | | | | 359/633 |
| 2018/0180817 A1* | 6/2018 | Yeoh | .................. | G02B 27/0081 |
| 2019/0302468 A1 | 10/2019 | Koshihara | | |
| 2023/0023570 A1* | 1/2023 | Qin | ...................... | G02B 27/123 |

FOREIGN PATENT DOCUMENTS

| | | | |
|---|---|---|---|
| WO | 2017169083 A1 | 10/2017 | |
| WO | 2020139752 A1 | 7/2020 | |

* cited by examiner

OPTICAL SYSTEMS WITH COLOR FILTERS FOR EMISSIVE DISPLAYS

This application is a continuation of international patent application No. PCT/US2021/049311, filed Sep. 7, 2021, which claims priority to U.S. provisional patent application No. 63/077,424, filed Sep. 11, 2020, which are hereby incorporated by reference herein in their entireties.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky, can consume excessive power, and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may provide image light to the eye box. The display may include one or more light source panels that emit the image light. A waveguide may have an input coupler that couples the image light into the waveguide. The waveguide may have an output coupler that couples the image light out of the waveguide and towards the eye box. A lens may be optically interposed between the light source panel and the input coupler and may direct the image light towards the input coupler.

A color filter may be optically interposed between the light source panel and the output coupler. The color filter may filter the image light using a steep cutoff characteristic. Multiple color filters may be used to filter different colors of the image light from different light source panels. If desired, an X-plate may be optically interposed between the light source panel and the lens (e.g., for combining image light of different colors from different light source panels). If desired, the color filter may be layered onto the color filter panel. In another suitable arrangement, the color filter may be layered onto a prism wedge in the X-plate. In another suitable arrangement, the color filter may be layered onto a partial reflector in the X-plate. In yet another suitable arrangement, the color filter may include an absorptive coating on the lens. If desired, the color filter may be a tilted dichroic filter in the lens. In still another suitable arrangement, the color filter may be layered on a reflective surface of the input coupler. If desired, the color filter may be a holographic optical element. The color filter may allow the image light to exhibit a desired color point while also allowing the light source panel to use light emitters having peak emission wavelengths that maximize the efficiency of the light emitters and thus the power efficiency of the display.

DETAILED DESCRIPTION

Figure 1:
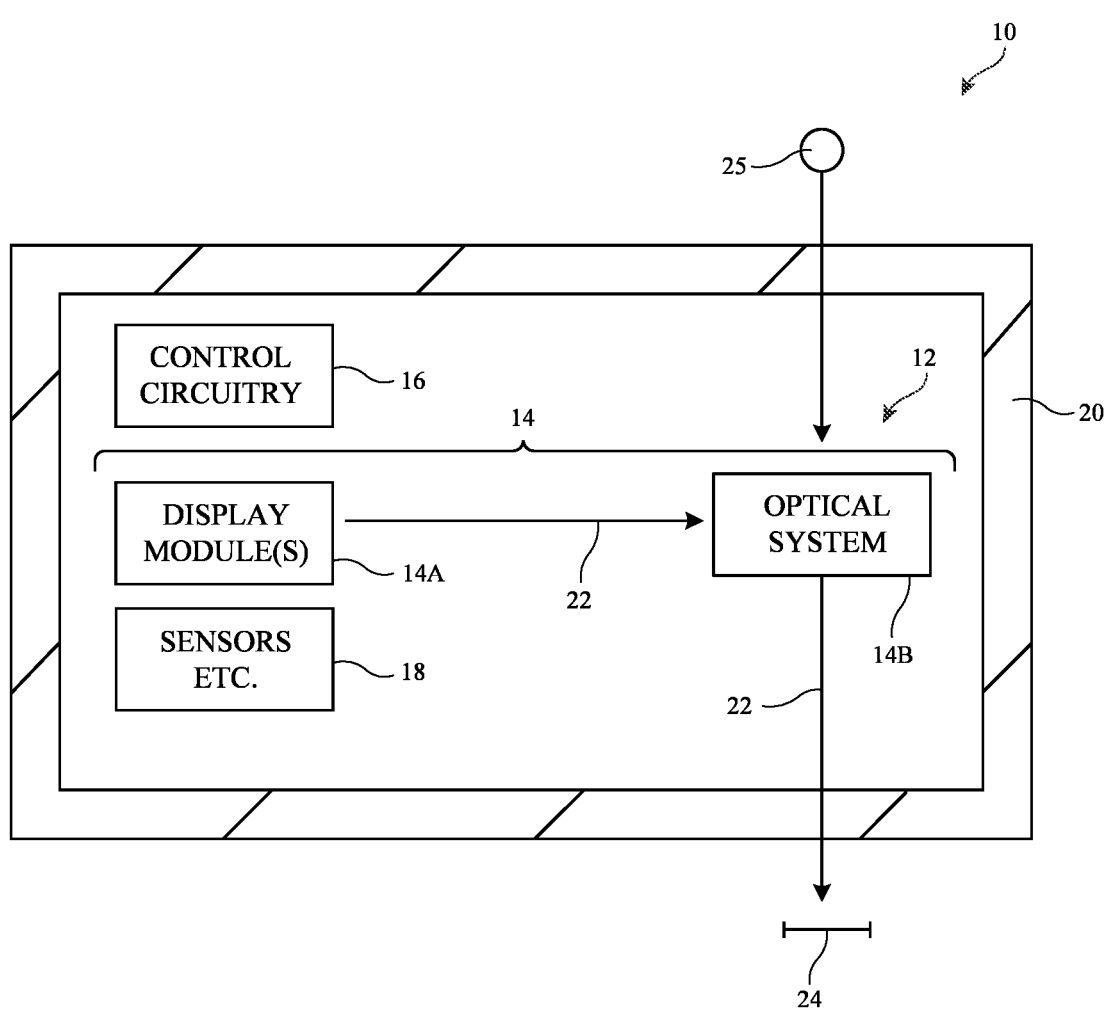
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 14A (sometimes referred to herein as display engines 14A, light engines 14A, or projectors 14A) may include reflective displays (e.g., displays having arrays of light sources that produce illumination light that reflect off of a reflective display panel to produce image light such as liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. An example in which display modules 14A are emissive displays that include emissive light sources is described herein as an example. The emissive light sources may include light emitting diodes (LEDs) such as micro light emitting diodes (uLEDs), organic light emitting diodes (OLEDS), or other LEDs, lasers, combinations of these, or any other desired light-emitting components. An example in which the emissive light sources include LEDs (e.g., uLEDs, OLEDs, or other LEDs) is described herein as an example.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
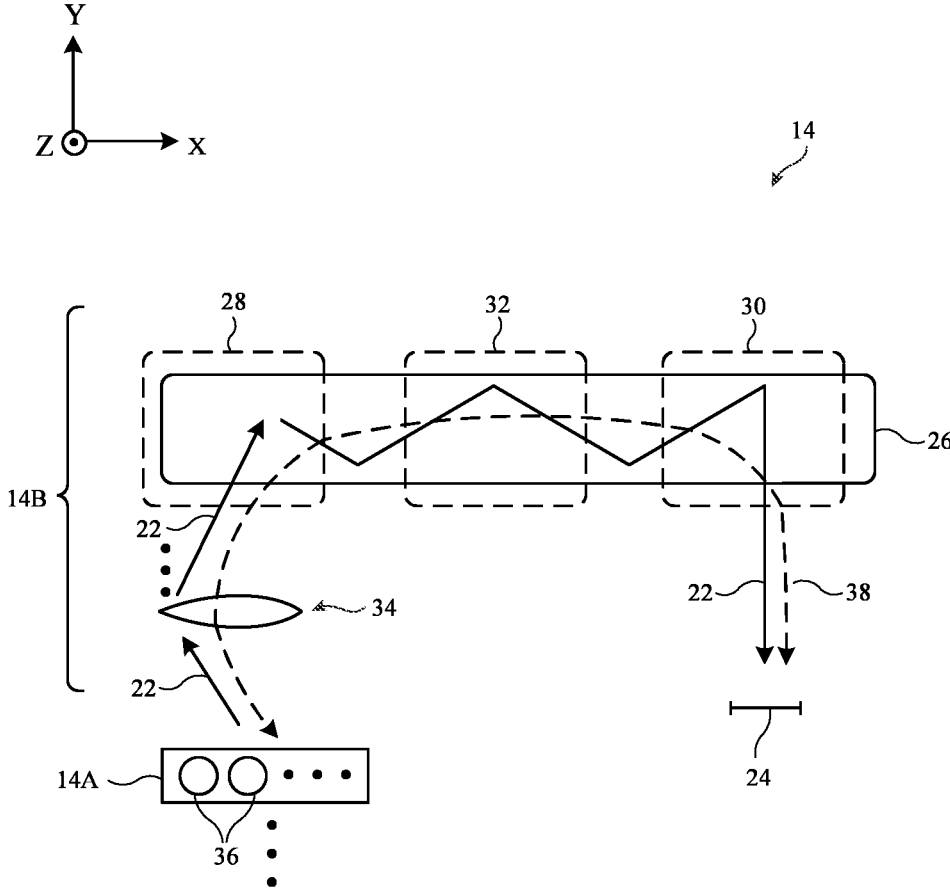
FIG. 2 is a top view of an illustrative optical system for a display having emissive light sources and a waveguide with an input coupler in accordance with some embodiments.

FIG. 2 is a top view of an illustrative display 14 that may be used in system 10 of FIG. 1. As shown in FIG. 2, display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34. Collimating lens 34 may include one or more lens elements that help direct image light 22 towards waveguide 26. Collimating lens 34 may be omitted if desired. If desired, display module 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module 14A may include one or more emissive light sources 36 that generate (emit) image light 22 associated with image content to be displayed to eye box 24. In one suitable arrangement that is described herein as an example, the emissive light sources include one or more (e.g., three) emissive light source panels. Each emissive light source panel may include an array of light emitters such as LEDs (e.g., uLEDs, OLEDs, other LEDs, etc.) that emit light of a corresponding color (wavelength range). Image light 22 may be collimated using a lens such as collimating lens 34. Optical system 14B may be used to present image light 22 output from display module 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module 14A into waveguide 26, whereas output coupler 30 may be configured to couple image light 22 from within waveguide 26 to the exterior of waveguide 26 and towards eye box 24. Input coupler 28 may include one or more input coupling prisms, one or more diffractive gratings, one or more facets or surfaces of waveguide 26, etc. As an example, display module 14A may emit image light 22 in direction +Y towards optical system 14B. When image light 22 strikes input coupler 28, input coupler 28 may redirect image light 22 so that the light propagates within waveguide 26 via total internal reflection towards output coupler 30 (e.g., in direction +X). When image light 22 strikes output coupler 30, output coupler 30 may redirect image light 22 out of waveguide 26 towards eye box 24 (e.g., in direction −Y). In scenarios where cross-coupler 32 is included at waveguide 26, cross-coupler 32 may redirect image light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.).

In one suitable arrangement that is sometimes described herein as an example, output coupler 30 is formed from diffractive gratings or micromirrors embedded within waveguide 26 (e.g., volume holograms recorded on a grating medium stacked between transparent polymer waveguide substrates, an array of micromirrors embedded in a polymer layer interposed between transparent polymer waveguide substrates, etc.), whereas input coupler 28 includes a prism mounted to an exterior surface of waveguide 26 (e.g., an exterior surface defined by a waveguide substrate that contacts the grating medium or the polymer layer used to form output coupler 30).

In other words, display 14 may provide image light 22 from display module 14A to eye box 24 along optical path 38. Collimating lens 34, input coupler 28, cross-coupler 32, and output coupler 30 may be (optically) interposed on optical path 38 (e.g., where cross-coupler 32 is optically interposed on optical path 38 between input coupler 28 and output coupler 30, output coupler 30 is optically interposed on optical path 38 between cross-coupler 32 and eye box 24, etc.). This example is merely illustrative and, in general, optical path 38 may include any desired optical components including any desired number of holographic optical elements arranged in any desired manner.

In one suitable arrangement that is described herein as an example, light sources 36 include LEDs that emit image light 22. The LEDs may be arranged in arrays in one or more emissive display panels (e.g., LED panels). Each display panel may include LEDs that emit light of a respective color. As an example, the LED panels may include a first LED panel with red LEDs that emit red light, a second LED panel with green LEDs that emit green light, and a third LED panel with blue LEDs that emits blue light. Due to limitations in epitaxial growth technology and finite emissive spectrum line-width, there are challenges to achieve saturated color from the red LEDs (e.g., red GaN-based LED pixels) and to control the color point for the green LEDs (e.g., GaN-based LED pixels), while also maintaining a high level of panel emissive power efficiency. This is because achieving and controlling desired wavelengths in LED epitaxial films comes with an LED efficiency penalty (e.g., because longer wavelength InGaN red LEDs have worse epitaxial film internal quantum efficiency and lower luminance due to a lower luminosity value). The GaN-based LEDs may, for example, comprise a GaN and/or AlGaN buffer layer, one or more InGaN quantum wells (QW) in the active layer (e.g., where the active layer is sandwiched between p- and n-doped regions), and an AlGaN electron blocking layer between the active layer and the p-doped regions.

In order to mitigate these issues and optimize power efficiency in the system, display 14 may include one or more color filters interposed on optical path 38 for spectrally filtering image light 22. The color filters may include long-pass filters, short-pass filters, bandpass filters, bandstop (notch) filters, or any other desired color filters. The color filters may serve to contain the color point of image light 22 without significantly sacrificing power efficiency and image quality. This may, for example, allow for the use of LED spectrum with specifically configured (e.g., shorter) peak emission wavelength, which in turn enables much higher internal quantum efficiency and/or spectral-average luminosity, thereby leading to improved display panel power efficiency.

In order to meet primary requirements for coloring a certain color gamut, the red LED needs to emit wavelengths that are longer than a certain limit. At the same time, the blue and green LEDs need to emit wavelengths that are between certain limits. The color gamut used by display 14 may include a DCIP3 color space or an sRGB color space, as just two examples. The broader spectrum for InGaN red LEDs generally requires a longer overall spectrum target. However, passing red light emitted by the red LEDs through a long pass filter may cut the short wavelength tail of image light produced by the red LEDs, which helps to move the color point to the red. At the same time, due to finite blue/green spectral linewidth only a small range of wavelength tuning (e.g., +/−3-4 nm) may be allowed for rendering DCIP3, which is difficult to control by epitaxial growth methods.

Figure 3:
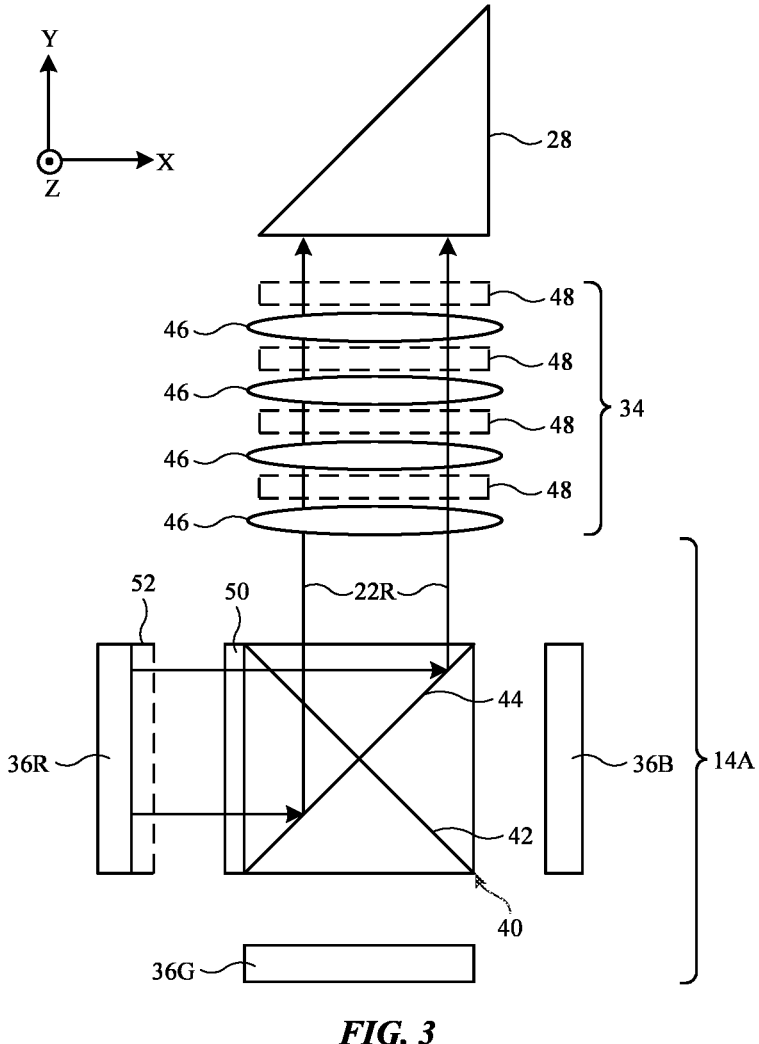
FIG. 3 is a top view of an illustrative optical system having emissive light sources and color filters in accordance with some embodiments.

In general, color filters for optimizing the performance of display 14 may be interposed on optical path 38 at any desired location(s). FIG. 3 is a top view showing some possible locations for the color filters. As shown in FIG. 3, display module 14A may include one or more light sources 36 such as a first light source 36R, a second light source 36G, and a third light source 36B. In one suitable arrangement that is described herein as an example, light source 36R emits red wavelengths of image light 22 (e.g., red image light 22R) and may therefore sometimes be referred to herein as red light source 36R, light source 36G emits green wavelengths of image light 22 and may therefore sometimes be referred to herein as green light source 36G, and light source 36B emits blue wavelengths of image light 22 and may therefore sometimes be referred to herein as blue light source 36B. This is merely illustrative and, in general, light sources 36R, 36G, and 36B may emit image light of any desired colors (wavelength ranges). Display module 14A may include fewer than all three of light sources 36R, 36G, and 36B or may include additional light sources 36 for emitting light in additional wavelength ranges if desired.

Red light source 36R may be a panel that includes an array of red emissive elements (red pixels) that emit red image light 22R. Blue light source 36B may be a panel that includes an array of blue emissive elements (blue pixels) that emit blue image light. Green light source 36G may be a panel that includes an array of green emissive elements (green pixels) that emit green image light. In one suitable arrangement that is described herein as an example, the emissive elements (pixels) in light sources 36R, 36G, and 36B may be LEDs (e.g., uLEDs, OLEDs, or other types of LEDs).

Each light source 36 may emit a corresponding range of wavelengths of image light 22. Only red image light 22R is shown in FIG. 3 for the sake of clarity. Display module 14A may include an optical element such as X-plate 40 that combines the image light produced by each light source 36 into image light 22. X-plate 40 may include a first partial reflector 42 and a second partial reflector 44 that intersects partial reflector 42. X-plate 40 may include prism wedges between partial reflectors 42 and 44 or may be free from prisms. In scenarios where X-plate 40 includes prism wedges, X-plate 40 may sometimes be referred to herein as X-cube 40.

Partial reflectors 42 and 44 may include material interfaces such as coatings. The coatings may configure partial reflectors 42 and 44 to transmit certain wavelengths of image light while reflecting other wavelengths of image light. For example, partial reflector 44 may reflect red image light 22R while transmitting green and blue image light from light sources 36B and 36G. At the same time, partial reflector 42 may reflect blue image light from blue light source 36B while transmitting green and red image light from light sources 36G and 36R.

As shown in FIG. 3, red light source 36R may emit red image light 22R. Partial reflector 44 may reflect red image light 22R towards collimating lens 34. Lens 34 may direct (focus) red image light 22R onto input coupler 28. Lens 34 may include one or more lens elements 46 interposed on optical path 38 of FIG. 2. Input coupler 28 may couple red image light 22R into waveguide 26 (FIG. 2). Input coupler 28 is shown as a reflective input coupling prism in the example of FIG. 3 (e.g., waveguide 26 is not shown in FIG. 3 for the sake of clarity). This is merely illustrative and, if desired, input coupler 28 may be a transmissive input coupling prism, a diffractive or holographic element, or any other desired input coupling structure for waveguide 26.

The display may include one or more color filters 50 that are optically interposed on optical path 38 (FIG. 2). If desired, color filter 50 may be optically interposed between red light source 36R and X-plate 40. As one example, color filter 50 may be layered onto a surface of X-plate 40 (e.g., a prism wedge used to form X-plate 40). As another example, color filter 50 may be spaced apart from both X-plate 40 and red light source 36R (e.g., in scenarios where X-plate 40 does not include prism wedges). As yet another example, color filter 50 may be layered onto a surface of red light source 36R (e.g., at location 52). Forming color filter 50 on the surface of red light source 36R may serve to minimize stray light. Forming color filter 50 on a prism wedge used to form X-plate 40 may reduce manufacturing cost and complexity relative to location 52, for example.

If desired, color filter 50 may be optically interposed on optical path 38 (FIG. 2) between X-plate 40 and input coupler 28. For example, color filter 50 may be interposed at one or more locations 48 between lens elements 46 in collimating lens 34 and/or between collimating lens 34 and input coupler 28. Locations 48 may be between lens elements 46 or may be on the surface of lens elements 46 (e.g., color filter 50 may be formed from an absorptive coating on the surface of one or more lens elements 46). Multiple color filters 50 may be used, such that a color filter 50 is located at one or more of these locations as shown in FIG. 3 if desired. Red image light 22R may pass through and be filtered by color filter 50 as the red image light passes to input coupler 28. Color filter 50 may serve to spectrally filter red image light 22R to contain the color point of image light 22 (e.g., so image light 22 contains a desired mix of wavelengths for a corresponding color gamut), allowing images at the eye box to exhibit the desired mix of wavelengths (e.g., for the corresponding color gamut) while also allowing the LEDs in red light source 36R to exhibit a desired peak or average emission wavelength that maximizes the efficiency of the LEDs and thus the power efficiency of display 14 (e.g., peak or average wavelengths that would not provide the desired mix of wavelengths for the corresponding color gamut in the absence of color filter 50).

While FIG. 3 illustrates the operation of color filter 50 on red image light 22R, color filters such as color filter 50 may also be used to filter green image light from green light source 36G and/or blue image light from blue light source 46B (e.g., at locations 48, on a prism wedge of X-plate 40, and/or on the light source itself). In one suitable arrangement that is sometimes described herein as an example, color filter 50 may be a long pass filter when used to filter red image light 22R (e.g., a long pass filter that passes red wavelengths while cutting off a shorter-wavelength tail of red image light 22R) and may be bandpass filter when used to filter blue or green image light. This example is merely illustrative and, in general, color filter 50 may be a short pass filter, a long pass filter, a bandpass filter, a band stop filter, or any other desired filter for any of the colors produced by light sources 36R, 36G, and 36B.

In one suitable arrangement that is described herein as an example, color filter 50 at location 52 or on X-plate 40 (e.g., as shown in FIG. 3) may be an absorptive filter that transmits filtered red image light 22. This is merely illustrative and, in general, color filter 50 may be a reflective or transmissive filter. In general, color filter 50 may be a dichroic filter, an absorptive filter (film), or a holographic filter, as examples.

If desired, light sources 36R, 36G, and 36B may be replaced by a single RGB panel. In these scenarios, X-plate 40 may be omitted and color filter 50 may be at one or more of locations 48 in collimating lens 34. In these scenarios, color filter 50 may be optimized to properly pass red, green, and blue bands of light corresponding to the image light emitted by red, green, and blue light sources in the single RGB panel.

Figure 4:
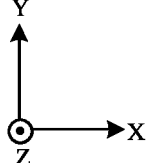
FIG. 4 is a top view of an illustrative optical system having a color filter on a partial reflector in an X-plate in accordance with some embodiments.
Figure 4:
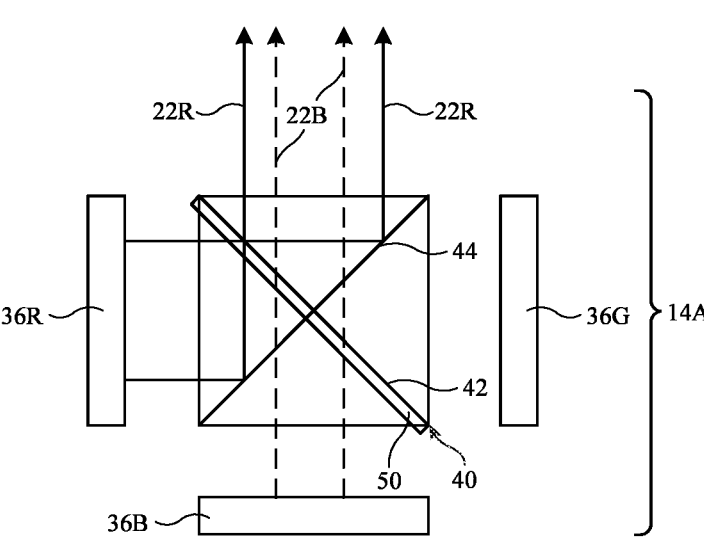

If desired, color filter 50 may be layered onto one or both of partial reflectors 42 and 44. FIG. 4 is a top view showing how color filter 50 may be layered onto partial reflector 42. As shown in FIG. 4, color filter 50 may be formed from a film or coating on partial reflector 42. Color filter 50 may filter red image light 22R after the red image light has already reflected off of partial reflector 44. Color filter 50 may also filter red image light 22R that has been received directly from red light source 36R. This filtered red image light 22R is then transmitted through partial reflector 42 and reflected off of partial reflector 44 towards the collimating lens. As an example, color filter 50 of FIG. 4 may be an absorptive filter that cuts off the reflection of green light from green light source 36G.

In this example, blue light source 36B emits blue image light 22B that is transmitted by color filter 50 and partial reflectors 42 and 44. Green light source 36G emits green image light that is reflected by partial reflector 42. Additional color filters 50 such as green and/or blue bandpass filters (not shown) may be layered onto partial reflectors 44 and/or 42 for the green and blue image light. These bandpass filters may be cross-coordinated among colors to allow for red, green, and blue image light to be passed to the collimating lens as image light 22.

Figure 5:
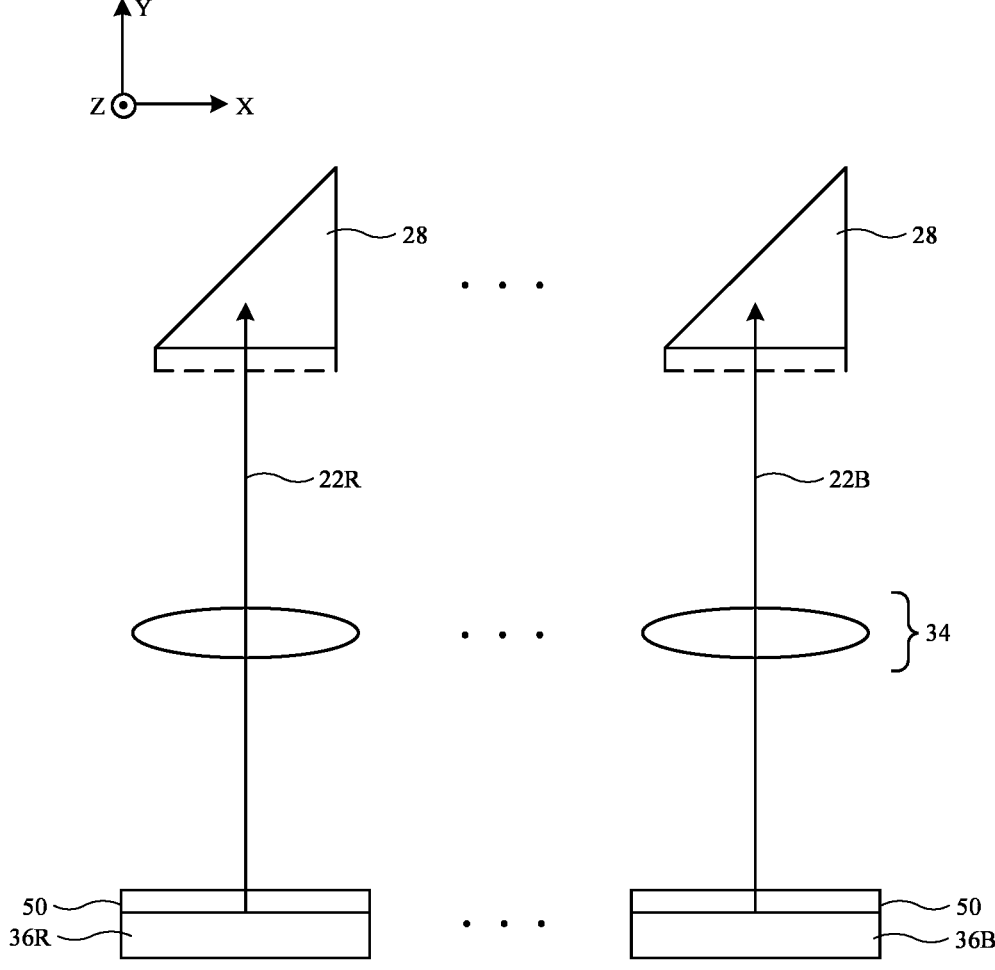
FIG. 5 is a top view of an illustrative optical system having separate color filters for providing image light to separate input couplers in accordance with some embodiments.

If desired, separate input couplers 28 may be used for each light source 36 in display module 14A. In these scenarios, separate color filters 50 may be used for each light source 36. FIG. 5 is a top view showing how separate input couplers and color filters may be used for each light source 36. As shown in FIG. 5, each light source 36 may produce a portion of image light 22 that is coupled into waveguide 26 (FIG. 2) by a respective input coupler 28.

If desired, color filters 50 may be layered onto the surface of one or more of the light sources 36 (e.g., red light source 36R, blue light source 36B, etc.). Forming color filters 50 on the surface of light sources 36 may serve to minimize stray light in the system, for example. In another suitable arrangement, color filters 50 may be formed at or on input couplers 28 (e.g., at a face of input couplers 28 facing light sources 36).

Figure 6:
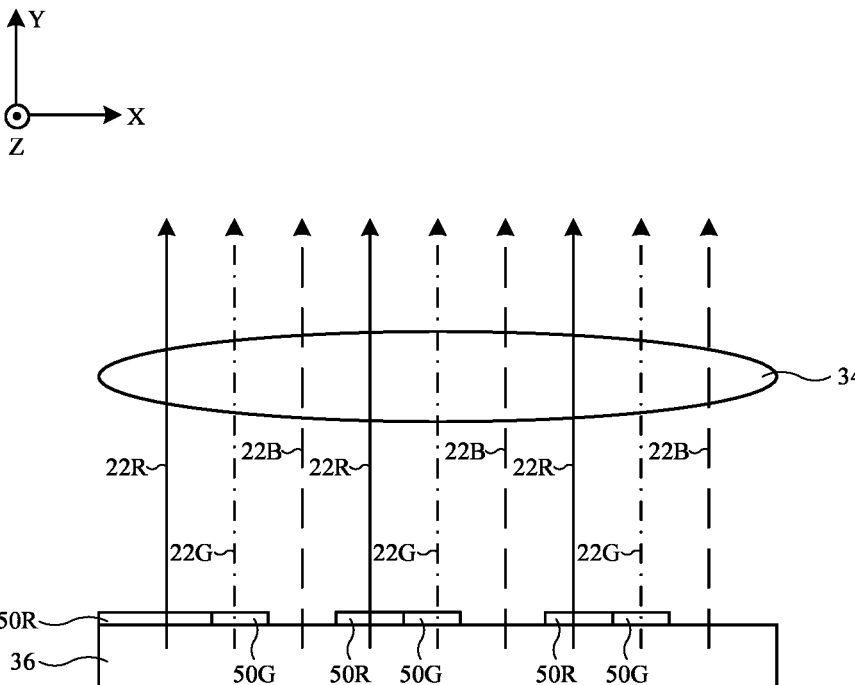
FIG. 6 is a top view of an illustrative emissive light source panel that emits multiple colors of image light in accordance with some embodiments.

If desired, the red, green, and blue light sources may be integrated into a single RGB panel that is provided with color filters 50. FIG. 6 is a top view showing how red, green, and blue light sources may be integrated into a single RGB panel that is provided with color filters 50. As shown in FIG. 6, light source 36 may be an emissive display panel having an array of light emitters/pixels (e.g., LEDs). The red LEDs may emit red image light 22R that is directed towards collimating lens 34. The blue LEDs may emit blue image light 22B that is directed towards collimating lens 34. The green LEDs may emit green image light 22G that is directed towards collimating lens 34.

As shown in FIG. 6, color filters 50 such as red color filters 50R and green color filters 50G may be layered onto a surface of light source 36. Red color filters 50R may overlap the red LEDs and blue color filters 50B may overlap the blue LEDs in light source 36. In the example of FIG. 6, the blue LEDs in light source 36 are not provided with any color filters 50. This is merely illustrative and, if desired, blue color filters may be layered over the blue LEDs. In one suitable arrangement that is described herein as an example, red color filter 50R is a long pass filter that passes red wavelengths while cutting off a short-wavelength tail of the red image light and green color filter 50G is a green bandpass filter. This example is merely illustrative.

Figure 7:
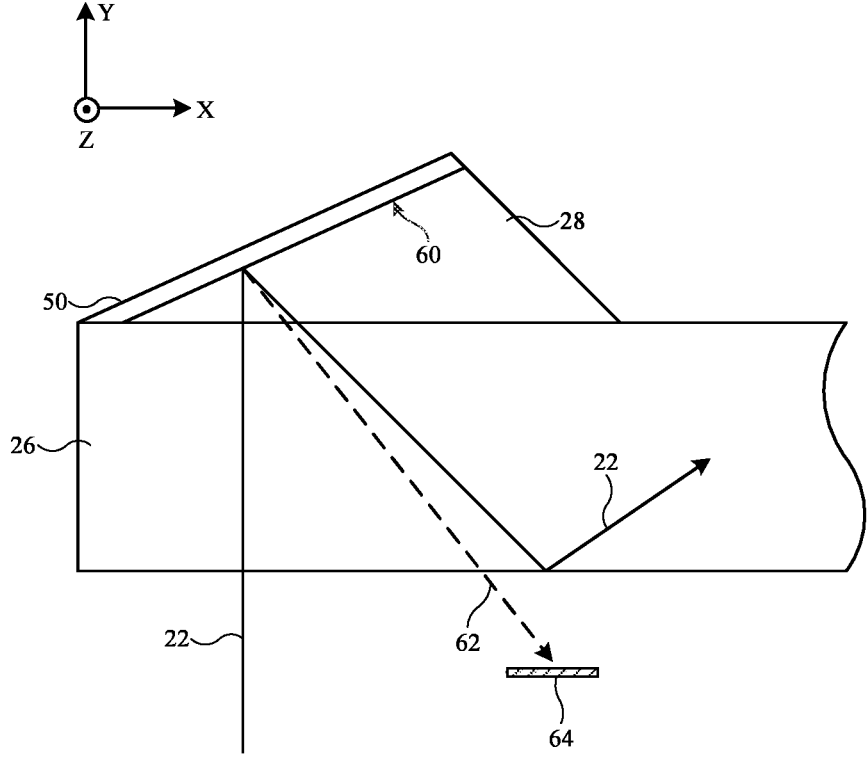
FIG. 7 is a top view of an illustrative input coupler having a reflective color filter in accordance with some embodiments.

If desired, color filter 50 may be a reflective color filter layered onto a reflective face of input coupler 28. FIG. 7 is a top view showing how color filter 50 may be a reflective color filter layered onto a reflective face of input coupler 28. As shown in FIG. 7, input coupler 28 may be a reflective input coupling prism mounted to waveguide 26 (e.g., a surface of waveguide 26 opposite the display module). The reflective input coupling prism may have a reflective surface 60 (e.g., a surface that is angled with respect to the lateral surface of waveguide 26). Image light 22 may pass through waveguide 26 and input coupler 28 and may reflect off of reflective surface 60 into waveguide 22. Color filter 50 may only reflect desired wavelengths of the image light 22 into waveguide 26 at an angle suitable for total internal reflection (e.g., an angle within the total internal reflection range of the waveguide). This may serve to filter other wavelengths out of the image light that reaches the eye box.

In one suitable arrangement, color filter 50 of FIG. 7 may be a holographic filter having one or more multiplexed holograms. The holograms may diffract light of a desired wavelength range into waveguide 26 for total internal reflection. The holograms may diffract other wavelengths of light at angles outside of the total internal reflection range of waveguide 26. For example, the holograms may diffract other wavelengths of light towards optical absorber 64, thereby removing these wavelengths from optical path 38 (FIG. 2).

A single color filter 50 for reflecting red image light 22R, the blue image light, or the green image light may be layered onto reflective surface 60. In another suitable arrangement, multiple color filters 50 for reflecting different colors may be layered onto reflective surface 60. In scenarios where a single RGB panel is used to produce image light 22, color filter 50 may be configured to pass (reflect) corresponding red, green, and blue bands of image light.

Figure 8:
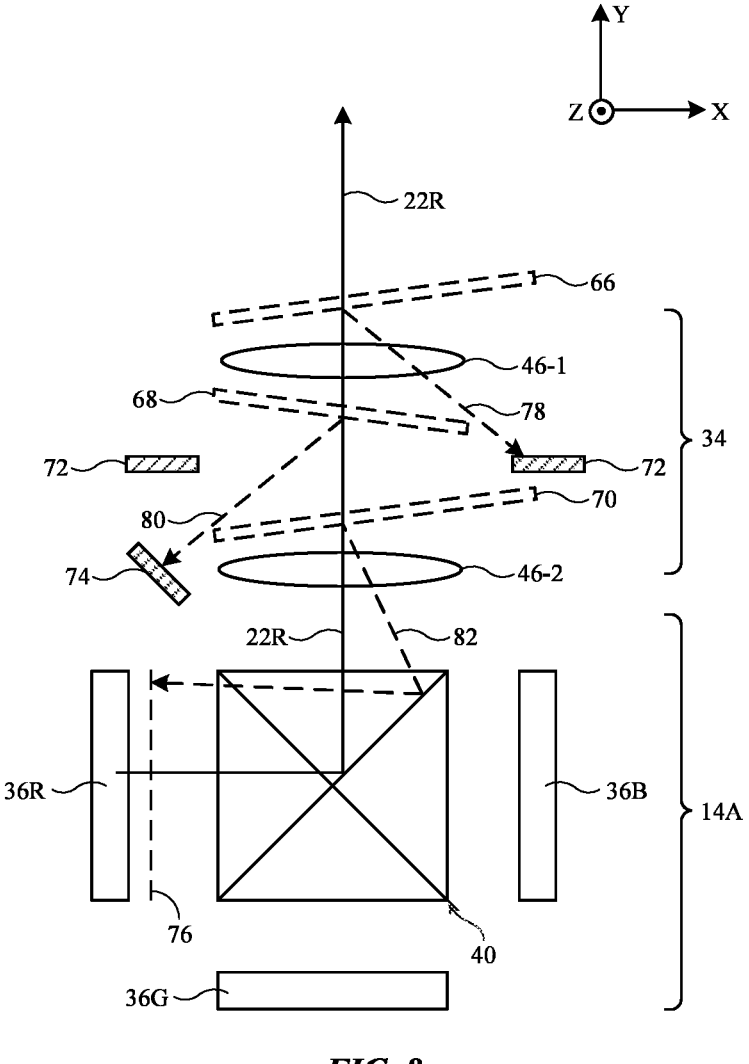
FIG. 8 is a top view of an illustrative optical system having tilted dichroic filters in accordance with some embodiments.

If desired, color filter 50 may be a tilted dichroic filter. FIG. 8 is a top view showing different locations for color filter 50 in examples where color filter 50 is a tilted dichroic filter. As shown in FIG. 8, collimating lens 34 may include a tilted dichroic filter (e.g., color filter 50) at location 66 between collimating lens 34 and the input coupler. The tilted dichroic filter may be tilted such that the image light is incident upon the filter at a non-orthogonal angle with respect to the lateral plane of the filter, for example. When the tilted dichroic filter is at location 66, the filter may pass filtered image light (e.g., red image light 22R) while reflecting other wavelengths of the image light out of the optical path, such as to stop aperture 72, as shown by arrow 78 (e.g., a stop aperture interposed between lens elements 46-1 and 46-2 of collimating lens 34).

As another example, collimating lens 34 may include a tilted dichroic filter (e.g., color filter 50) at location 68 between lens elements 46-1 and 46-2. When the tilted dichroic filter is at location 68, the filter may pass filtered image light (e.g., red image light 22R) while reflecting other wavelengths of the image light out of the optical path, such as to light trap 74 (e.g., an optical absorber), as shown by arrow 80.

As yet another example, collimating lens 34 may include a tilted dichroic filter (e.g., color filter 50) at location 70 between lens elements 46-1 and 46-2. When the tilted dichroic filter is at location 70, the filter may pass filtered image light (e.g., red image light 22R) while reflecting other wavelengths of the image light out of the optical path, such as to absorbing mask 76 via X-plate 40. While FIG. 8 only illustrates the operation of color filter 50 on red image light 22R, color filters 50 may similarly operate on the green image light emitted by green light source 36G and/or the blue image light emitted by blue light source 36B.

Using color filter(s) 50 may allow display 14 to exhibit a desired color point despite using LEDs that emit light at peak wavelengths that maximize the efficiency of the LEDs and thus the power efficiency of the display. In the absence of the color filters, LEDs that emit light at peak wavelengths that maximize the efficiency of the LEDs may be incapable of recovering the desired color point. In order to recover the desired color point, color filter 50 may exhibit a relatively steep cutoff as a function of wavelength.

Figure 9:
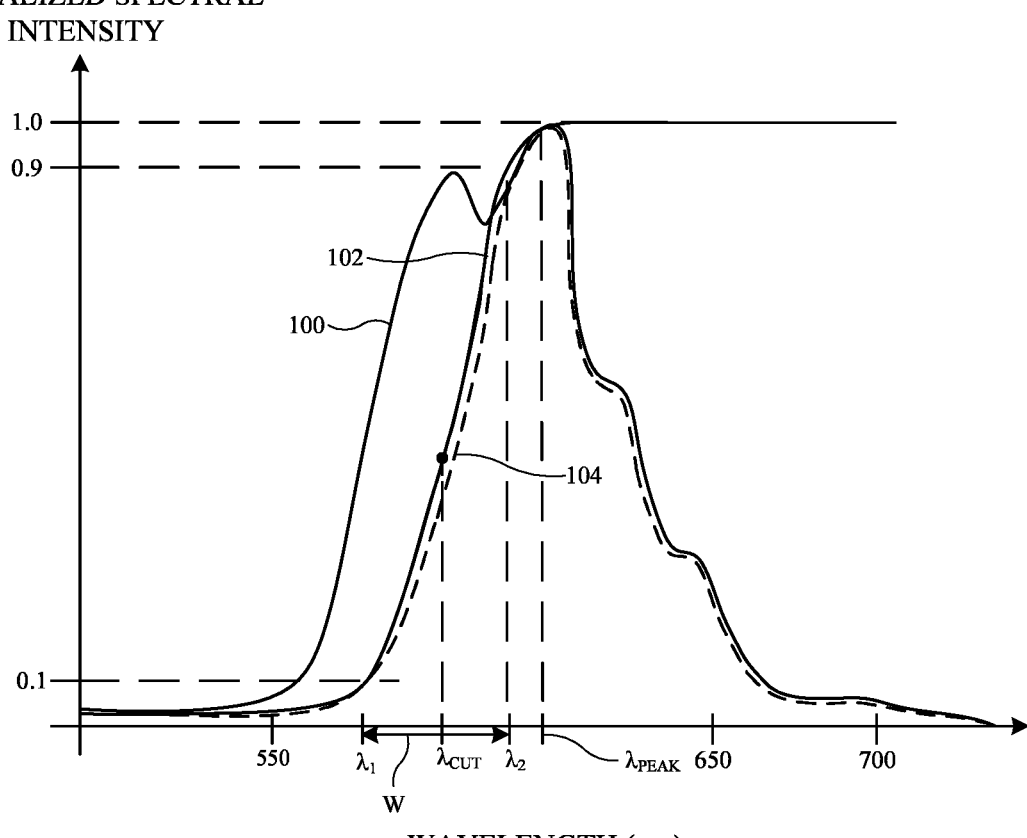
FIG. 9 is a plot of normalized spectral intensity as a function of wavelength for an illustrative emissive light source and color filter in accordance with some embodiments.

FIG. 9 is a plot showing one example of how color filter 50 may filter red image light 22R to recover a desired color point for image light 22. In FIG. 9, the horizontal axis plots wavelength (e.g., in nm). The vertical axis plots spectral intensity normalized to the peak intensity of a given light emitter in red light source 36R (e.g., a red LED in red light source 36R). In the example of FIG. 9, the color filter is a long pass filter. This is merely illustrative and, if desired, the color filter may be a band pass filter that absorbs light at longer wavelengths than the red emission range.

Curve 100 of FIG. 9 plots an example of a modulated spectral response of a red LED in light source 36R. As show by curve 100, the red LED may exhibit peak intensity at peak emission wavelength $\lambda_{PEAK}$ (e.g., a red wavelength). The color filter 50 used to filter the red image light 22R produced by the red LED may have a transmission coefficient as given by curve 102. As shown by curve 102, the color filter may be a long pass filter that passes relatively long wavelengths and that blocks (absorbs) relatively low wavelengths (e.g., the color filter may absorb or deflect an orange spectrum tail of the red image light).

In order to recover the desired color point in the image light, color filter 50 (curve 102) may exhibit a relatively steep cutoff characteristic. For example, curve 102 may exhibit a transmission coefficient of 0.9 (90%) at wavelength 22 and may exhibit a transmission coefficient of 0.1 (10%) at wavelength M. The steepness (sharpness) in the cutoff of color filter 50 may be characterized by a 90%/10% cutoff characteristic W. 90%/10% cutoff characteristic W may, for example, be the separation in wavelength between which the color filter exhibits a 90% transmission coefficient and a 10% transmission coefficient (e.g., 90%/10% cutoff characteristic W may be equal to $\lambda_2-\lambda_1$). As used herein, 90%/10% cutoff characteristic W may also account for filtering effects in the coatings on partial reflectors 42 and/or 44 in scenarios where the color filter is interposed between X-plate 40 and light sources 36. A 90%/10% cutoff characteristic may be used to characterize either a rising cutoff or a falling cutoff of color filter 50. The 90%/10% cutoff characteristic may sometimes also be referred to as a 10%/90% cutoff characteristic.

Color filter 50 may also be characterized by a corresponding cutoff wavelength $\lambda_{CUT}$. Cutoff wavelength $\lambda_{CUT}$ may, for example, be defined as the wavelength that is halfway between wavelengths $\lambda_2$ and $\lambda_1$ (e.g., the wavelength corresponding to one-half of 90%/10% cutoff characteristic W). In general, shorter 90%/10% cutoff characteristics are associated with a steeper filter response (e.g., a steeper transition in transmission coefficient as a function of wavelength from blocking image light to passing image light) and longer 90%/10% cutoff characteristics are associated with a shallower filter response.

Dashed curve 104 of FIG. 9 shows the spectral intensity of red image light 22R that has been filtered by color filter 50 (e.g., by applying the long pass filter associated with curve 102 to the LED response associated with curve 100). As shown by curve 104, color filter 50 may cut off the shorter wavelength tail associated with curve 100. This may, for example, allow the red LED to be selected to exhibit a shorter peak emission wavelength or a shorter average emission wavelength (e.g., centroid wavelength) $\lambda_{AVG}$ (e.g., where $\lambda_{AVG}$=sum (Int($\lambda$)*$\lambda$)/sum (Int($\lambda$)) and Int( ) is the integral of curve 100 over wavelength) than would otherwise be possible (for recovering a desired color point) in the absence of the color filter. Red LEDs that operate at these shorter peak or average emission wavelengths may, for example, exhibit greater efficiency than red LEDs that peak at greater wavelengths. This may thereby serve to optimize power efficiency in display 14, while color filter 50 serves to recover a desired color point despite the shorter peak or average emission wavelength of the red LEDs.

The example of FIG. 9 is merely illustrative. Curves 100-104 may have other shapes in practice. While the example of FIG. 9 illustrates the operation of color filter 50 on red image light 22R, additional color filters 50 may also operate on the green image light emitted by green light source 22G and/or the blue image light emitted by blue light source 22B. These color filters 50 may, for example, be bandpass filters. The bandpass filters may have a corresponding pass band with a shorter cutoff wavelength λCUT and a longer cutoff wavelength $\lambda_{CUT}$ on either side of the pass band. In order to recover the desired color point in image light 22, the 90%/10% cutoff characteristic about each cutoff wavelength $\lambda_{CUT}$ for the red, green, and/or blue color filters 50 may be relatively steep (e.g., less than a maximum threshold 90%/10% cutoff characteristic value such as 10 nm).

Figure 10:
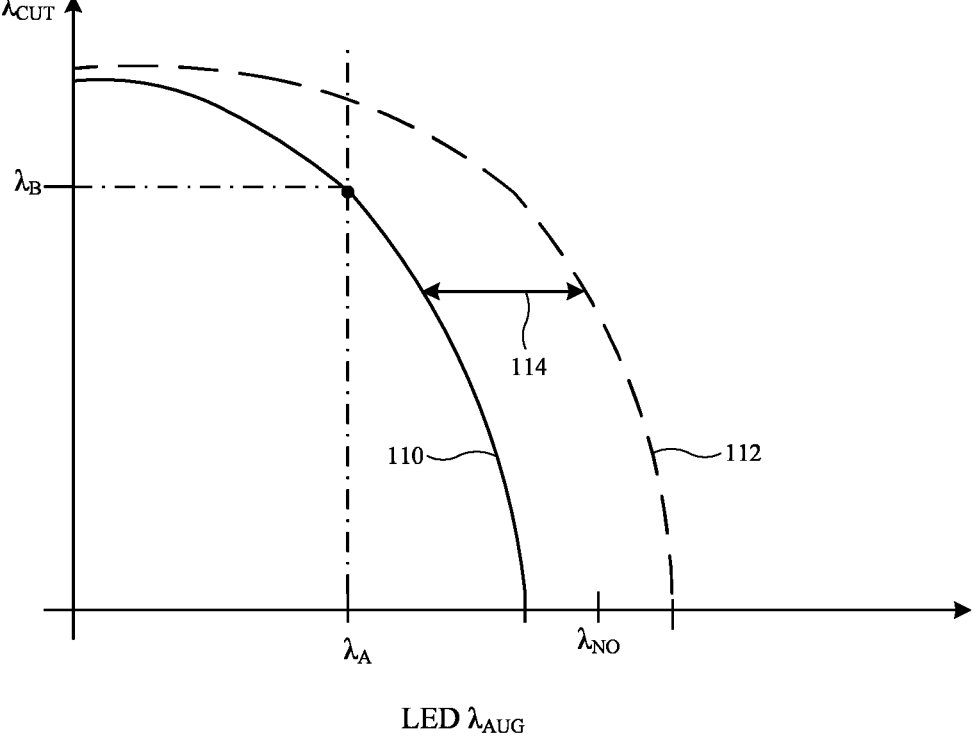
FIG. 10 is a plot of color filter cutoff wavelength as a function of emissive light source average wavelength in accordance with some embodiments.

In general, the cutoff wavelength $\lambda_{CUT}$ for each of the color filters 50 may be selected based on the peak or average emission wavelength of the corresponding LED. FIG. 10 is a plot showing how cutoff wavelength $\lambda_{CUT}$ may be selected based on the average wavelength $\lambda_{AVG}$ of a corresponding LED. In FIG. 10, the horizontal axis plots the average wavelength $\lambda_{AVG}$ of the LED and the vertical axis plots cutoff wavelength $\lambda_{CUT}$. Curve 110 plots the most efficient filter cutoff wavelength $\lambda_{OFF}$ for each average wavelength $\lambda_{AVG}$ of the corresponding LED. In general, any cutoff wavelength within margin 114 between curve 110 and dashed curve 112 may recover a suitable color point in the image light.

The cutoff wavelength $\lambda_{CUT}$ to use for any given color filter 50 may be selected based on curves 110 and 112. For example, the most efficient average wavelength $\lambda_{AVG}$ may first be identified (e.g., a particular LED composition/design may be identified that produces image light with a corresponding average or centroid wavelength $\lambda_{AVG}$). Then, curves 110 and 112 may be used to select the cutoff wavelength $\lambda_{CUT}$ to use for the color filter 50 that filters the image light. For example, if an LED having an optimal efficiency and an average wavelength $\lambda_A$ is identified, the corresponding cutoff wavelength $\lambda_{CUT}$ on curve 110 (e.g., cutoff wavelength $\lambda_B$) may be the most efficient cutoff wavelength to use for that LED. However, in general, any cutoff wavelength $\lambda_{CUT}$ corresponding to average wavelength $\lambda_A$ that lies within margin 114 between curves 110 and 112 may be used for color filter 50.

The example of FIG. 10 is merely illustrative. Curves 110 and 112 may have other shapes in practice (e.g., depending on the color gamut to be used). In other words, by selecting LEDs for light sources 36R, 36G, and/or 36B that optimize LED efficiency and thus power efficiency for display module 14A and then providing color filters 50 for one or more of the light sources that exhibit a corresponding cutoff wavelength $\lambda_{CUT}$ and a relatively steep cutoff characteristic (e.g., a relatively steep 90%/10% cutoff characteristic W, as shown in FIG. 9), the power efficiency of display module 14A may be maximized without sacrificing color point in the images provided to the eye box.

For example, in order to recover the desired color point, the color filter 50 that is used to filter red image light emitted by red light source 36R may be a long pass filter having a 90%/10% cutoff characteristic W of less than or equal to 20 nm, less than 18 nm, less than 15 nm, 18 nm, less than 25 nm, less or equal to than 30 nm, or another suitably steep cutoff characteristic. The cutoff wavelength $\lambda_{CUT}$ for the red color filter may be between 580-605 nm. The peak emission wavelength $\lambda_{PEAK}$ of the corresponding red LED in red light source 36R may be between 580-620 nm. While these wavelengths are described herein in terms of peak wavelength by way of example, the wavelengths may also be described in terms of average or centroid wavelength. The color filters 50 that are used to filter green image light emitted by green light source 36G or blue image light emitted by blue light source 36B may be bandpass filters having a pass band (bandpass) that is 20-80 nm wide with sharp cutoffs on either side of the pass band. The 90%/10% cutoff characteristic on either side of the pass band for the green and blue color filters may be, for example, less than 10 nm, less than 5 nm, less than 15 nm, or another suitably steep cutoff characteristic. The peak emission wavelength $\lambda_{PEAK}$ of the corresponding blue LED in blue light source 36B may be between 457-470 nm and the peak emission wavelength $\lambda_{PEAK}$ of the corresponding green LED in green light source 36G may be between 525-550 nm, for example.

In one more specific example, when display 14 is operating using a DCIP3 color gamut, the red LEDs in red light source 36R may have a peak emission wavelength $\lambda_{PEAK}$ between 605-620 nm and the corresponding (red) color filter 50 may be a long pass or bandpass red color filter (or combination of color filters) having an absorptive cutoff wavelength (e.g., $\lambda_{CUT}$) between 595-605 nm. At the same time, when display 14 is operating using the DCIP3 color gamut, the green LEDs in green light source 36G may have a peak emission wavelength $\lambda_{PEAK}$ between 525-550 nm and the corresponding (green) color filter 50 may be a bandpass green color filter having a pass band with a bandwidth (e.g., a pass bandwidth) of 30-50 nm and a sharp (steep) 90%/10% cutoff characteristic of less than 10 nm on both sides of the pass band. Configuring the green color filter in this way may relax tolerance in $\lambda_{AVG}$ for the green image light from 7 nm to greater than 12 nm, for example.

When display 14 is operating using an sRGB color gamut, the red LEDs in red light source 36R may have a peak emission wavelength $\lambda_{PEAK}$ between 600-615 nm and the corresponding (red) color filter 50 may be a long pass or bandpass red color filter (or combination of color filters) having an absorptive cutoff wavelength (e.g., $\lambda_{CUT}$) between 580-595 nm. When display 14 is operating using either the DCIP3 color gamut or the sRGB color gamut, the blue LEDs in blue source 36B may have a peak emission wavelength $\lambda_{PEAK}$ between 457-470 nm and the corresponding (blue) color filter 50 may be a bandpass blue color filter having a pass band with a bandwidth (e.g., a pass bandwidth) of 20-30 nm and a sharp (steep) 90%/10% cutoff characteristic of less than 10 nm on both sides of the pass band. The pass bandwidth may be defined as the difference in wavelength between the cutoff wavelength $\lambda_{CUT}$ on the upper end of the corresponding pass band and the cutoff wavelength $\lambda_{CUT}$ on the lower end of the corresponding pass band (e.g., where cutoff wavelength $\lambda_{CUT}$ is defined by the midpoint of the corresponding 90%/10% cutoff characteristic).

In examples where color filter 50 is a dichroic long pass filter (e.g., for filtering red image light 22R), color filter 50 may be formed from a multi-layer thin film interference filter, if desired. The thin film interference filter may include alternating layers of high and low index materials such as TiO2 and SiO2. As just one example, the thin film interference filter may include a first SiO2 layer having a thickness between 2-3 nm, a second TiO2 layer between 25-28 nm, a third SiO2 layer between 90-100 nm, a fourth TiO2 layer between 170-175 nm, a fifth SiO2 layer between 90-100 nm, a sixth TiO2 layer between 170-175 nm, a seventh SiO2 layer between 90-100 nm, an eighth TiO2 layer between 170-175 nm, a ninth SiO2 layer between 90-100 nm, a tenth TiO2 layer between 170-175 nm, an eleventh SiO2 layer between 90-100 nm, a twelfth TiO2 layer between 170-175 nm, a thirteenth SiO2 layer between 90-100 nm, a fourteenth TiO2 layer between 170-175 nm, a fifteenth SiO2 layer between 60-70 nm, a sixteenth TiO2 layer between 40-50 nm, and a seventeenth SiO2 layer between 70-80 nm. Other stack ups may be used. Any of the color filters described herein may be thin-film interference filters if desired.

In accordance with an embodiment, a display system configured to display image light, the display system is provided that includes a waveguide having an input coupler configured to couple the image light into the waveguide and having an output coupler configured to couple the image light out of the waveguide; a light source panel configured to emit the image light; intersecting partial reflectors optically interposed between the light source panel and the input coupler, the intersecting partial reflectors are configured to direct the image light towards the waveguide; and a color filter optically interposed between the waveguide and the light source panel, the color filter is configured to filter the image light.

In accordance with another embodiment, the color filter is layered onto the light source panel.

In accordance with another embodiment, the display system includes a prism wedge on the intersecting partial reflectors, the color filter is layered onto the prism wedge.

In accordance with another embodiment, the intersecting partial reflectors include a first partial reflector configured to transmit the image light emitted by the light source panel; and a second partial reflector configured to reflect the image light emitted by the light source panel, the color filter is layered onto the first partial reflector.

In accordance with another embodiment, the color filter is configured to transmit blue light and is configured to absorb or deflect green light.

In accordance with another embodiment, the color filter is further configured to pass red light while absorbing or deflecting an orange spectrum tail of the red light.

In accordance with another embodiment, the image light emitted by the light source panel includes red image light and the color filter includes a filter selected from the group consisting of: a long pass filter and a bandpass filter.

In accordance with another embodiment, the color filter is configured to filter the red image light with a 90%/10% cutoff characteristic less than or equal to 20 nm.

In accordance with another embodiment, the color filter is an absorptive color filter.

In accordance with another embodiment, the light source panel includes an array of micro light emitting diodes (uLEDs), the uLEDs have a peak emission wavelength between 600 nm and 620 nm, and the color filter has a cutoff wavelength between 580 and 605 nm.

In accordance with an embodiment, a display system configured to display image light, the display system is provided that includes a waveguide having an input coupler configured to couple the image light into the waveguide and having an output coupler configured to couple the image light out of the waveguide; a light source panel configured to emit the image light; a lens optically interposed between the light source panel and the waveguide, the lens is configured to direct the image light towards the input coupler; intersecting partial reflectors optically interposed between the light source panel and the lens, the intersecting partial reflectors are configured to direct the image light towards the lens; and a color filter optically interposed between the light source panel and the output coupler, the color filter is configured to filter the image light.

In accordance with another embodiment, the input coupler includes a reflective input coupling prism on the waveguide and the color filter is layered on a reflective surface of the reflective input coupling prism.

In accordance with another embodiment, the color filter includes a set of holograms, the set of holograms is configured to reflect a wavelength range of the image light into the waveguide within a total internal reflection range of the waveguide, and the set of holograms is configured to reflect wavelengths of the image light outside of the wavelength range towards an optical absorber.

In accordance with another embodiment, the color filter includes an absorptive coating on the lens.

In accordance with another embodiment, the display system includes a stop aperture, the color filter includes a tilted dichroic filter optically interposed between the lens and the input coupler, the tilted dichroic filter is configured to transmit a wavelength range of the image light to the input coupler, and the tilted dichroic filter is configured to reflect wavelengths of the image light outside of the wavelength range towards the stop aperture.

In accordance with another embodiment, the display system includes a light trap; a first lens element in the lens; and a second lens element in the lens, the color filter includes a tilted dichroic filter optically interposed between the first and second lens elements, the tilted dichroic filter is configured to transmit a wavelength range of the image light to the second lens element, and the tilted dichroic filter is configured to reflect wavelengths of the image light outside of the wavelength range towards the light trap.

In accordance with another embodiment, the display system includes an absorbing mask between the light source panel and the intersecting partial reflectors; a first lens element in the lens; and a second lens element in the lens, the color filter includes a tilted dichroic filter optically interposed between the first and second lens elements, the tilted dichroic filter is configured to transmit a wavelength range of the image light to the second lens element, and the tilted dichroic filter is configured to reflect wavelengths of the image light outside of the wavelength range towards the absorbing mask via the intersecting partial reflectors.

In accordance with an embodiment, a display system configured to display image light, the display system is provided that includes a waveguide having an input coupler configured to couple the image light into the waveguide and having an output coupler configured to couple the image light out of the waveguide; a light source panel configured to emit the image light; a lens optically interposed between the light source panel and the waveguide, the lens is configured to direct the image light towards the input coupler; and a color filter optically interposed between the light source and the output coupler, the color filter is configured to filter the image light with a 90%/10% cutoff characteristic less than or equal to 30 nm.

In accordance with another embodiment, the light source panel includes micro light emitting diodes (uLEDs) configured to emit the image light with a peak wavelength between 600 nm and 620 nm and the color filter has a cutoff wavelength between 580 nm and 605 nm.

In accordance with another embodiment, the light source panel includes micro light emitting diodes (uLEDs) configured to emit the image light with a peak wavelength between 525 nm and 550 nm, the color filter includes a bandpass filter having a pass band with a bandwidth between 30 nm and 50 nm, and the 90%/10% cutoff characteristic is less than or equal to 10 nm on both sides of the pass band.

In accordance with another embodiment, the light source panel includes micro light emitting diodes (uLEDs) configured to emit the image light with a peak wavelength between 457 nm and 470 nm, the color filter includes a bandpass filter having a pass band with a bandwidth between 20 nm and 30 nm, and the 90%/10% cutoff characteristic is less than or equal to 10 nm on both sides of the pass band.

In accordance with another embodiment, the light source panel includes a red light emitting diode (LED) configured to emit a first portion of the image light, a green LED configured to emit a second portion of the image light, and a blue LED configured to emit a third portion of the image light, the color filter is layered over the red LED, the display system includes a bandpass filter layered over the green LED, and the bandpass filter has a pass band with a bandwidth between 30 nm and 80 nm.

In accordance with another embodiment, the display system includes an additional input coupler on the waveguide; an additional light source panel configured to emit additional image light; and an additional color filter optically interposed between the additional light source panel and the additional input coupler, the additional color filter being configured to filter the additional image light and the additional input coupler being configured to couple the additional image light into the waveguide.

In accordance with another embodiment, the color filter is layered onto the light source panel and the additional color filter is layered onto the additional light source panel.

In accordance with another embodiment, the color filter is layered onto the input coupler and the additional color filter is layered onto the additional input coupler.

The foregoing is merely illustrative and various modifications can be made to the described embodiments. The foregoing embodiments may be implemented individually or in any combination.

What is claimed is:

1. A display system configured to display image light, the display system comprising:

a waveguide having an input coupler configured to couple the image light into the waveguide and having an output coupler configured to couple the image light out of the waveguide;

a light source panel configured to emit the image light;

intersecting partial reflectors optically interposed between the light source panel and the input coupler, wherein the intersecting partial reflectors are configured to direct the image light towards the waveguide; and a reflective color filter optically interposed between the waveguide and the light source panel, wherein the reflective color filter is configured to filter the image light, wherein the reflective color filter is layered on the input coupler, wherein the reflective color filter comprises a set of holograms, wherein the set of holograms is configured to reflect a wavelength range of the image light into the waveguide within a total internal reflection range of the waveguide, and wherein the set of holograms is configured to reflect wavelengths of the image light outside of the wavelength range towards an optical absorber.

2. The display system of claim 1, further comprising:

an additional light source panel configured to emit additional image light, wherein the intersecting partial reflectors are further configured to direct the additional image light towards the waveguide, wherein the input coupler is further configured to couple the additional image light into the waveguide, and wherein the output coupler is further configured to couple the additional image light out of the waveguide; and an additional reflective color filter layered on the input coupler, wherein the additional reflective color filter is configured to filter the additional image light.

3. The display system of claim 2, wherein the image light comprises red image light and the additional image light comprises green image light.

4. The display system of claim 1, wherein the reflective color filter is configured to transmit blue light and is configured to deflect green light.

5. The display system of claim 1, wherein the reflective color filter is configured to pass red light while deflecting an orange spectrum tail of the red light.

6. The display system of claim 1, wherein the image light emitted by the light source panel comprises red image light and wherein the reflective color filter comprises a filter selected from the group consisting of: a long pass filter and a bandpass filter.

7. The display system of claim 6, wherein the reflective color filter is configured to filter the red image light with a 908/10% cutoff characteristic less than or equal to 20 nm.

8. The display system of claim 6, wherein the image light comprises red image light, blue image light, and green image light.

9. The display system of claim 1, wherein the light source panel comprises an array of micro light emitting diodes (uLEDs), the uLEDs have a peak emission wavelength between 600 nm and 620 nm, and the reflective color filter has a cutoff wavelength between 580 and 605 nm.

10. A display system configured to display image light, the display system comprising:

a waveguide having an input coupler configured to couple the image light into the waveguide and having an output coupler configured to couple the image light out of the waveguide;

a light source panel configured to emit the image light;

a lens optically interposed between the light source panel and the waveguide, wherein the lens is configured to direct the image light towards the input coupler;

intersecting partial reflectors optically interposed between the light source panel and the lens, wherein the intersecting partial reflectors are configured to direct the image light towards the lens; and a color filter optically interposed between the lens and the input coupler, wherein the color filter is configured to transmit a wavelength range of the image light to the input coupler and reflect wavelengths of the image light outside of the wavelength range towards an optical absorber.

11. The display system of claim 10, wherein the wavelength range of the image light comprises red light and wherein the wavelengths of the image light outside of the wavelength range comprise an orange spectrum tail of the red light.

12. The display system of claim 10, wherein the image light emitted by the light source panel comprises red image light and wherein the color filter comprises a filter selected from the group consisting of: a long pass filter and a bandpass filter.

13. The display system of claim 12, wherein the color filter is configured to filter the red image light with a 90%/10% cutoff characteristic less than or equal to 20 nm.

14. The display system of claim 10, wherein the color filter comprises a tilted dichroic filter optically interposed between the lens and the input coupler.

15. The display system of claim 10, further comprising:

a first lens element in the lens; and a second lens element in the lens, wherein the color filter comprises a tilted dichroic filter optically interposed between the first and second lens elements, the tilted dichroic filter is configured to transmit the wavelength range of the image light to the second lens element, and the tilted dichroic filter is configured to reflect the wavelengths of the image light outside of the wavelength range towards the optical absorber.

16. The display system of claim 10, further comprising:

a first lens element in the lens; and a second lens element in the lens, wherein the color filter comprises a tilted dichroic filter optically interposed between the first and second lens elements, the optical absorber comprises an absorbing mask between the light source panel and the intersecting partial reflectors, the tilted dichroic filter is configured to transmit the wavelength range of the image light to the second lens element, and the tilted dichroic filter is configured to reflect the wavelengths of the image light outside of the wavelength range towards the absorbing mask via the intersecting partial reflectors.

17. A display system configured to display image light, the display system comprising:

a waveguide having an input coupler configured to couple the image light into the waveguide and having an output coupler configured to couple the image light out of the waveguide;

a light source panel configured to emit the image light;

a lens optically interposed between the light source panel and the waveguide, wherein the lens is configured to direct the image light towards the input coupler;

intersecting partial reflectors optically interposed between the light source panel and the lens, wherein the intersecting partial reflectors are configured to direct the image light towards the lens;

a color filter optically interposed between the light source
   panel and the output coupler, wherein the color filter is
   configured to filter the image light;
an absorbing mask between the light source panel and the
   intersecting partial reflectors;
a first lens element in the lens; and
a second lens element in the lens, wherein the color filter
   comprises a tilted dichroic filter optically interposed
   between the first and second lens elements, the tilted
   dichroic filter is configured to transmit a wavelength
   range of the image light to the second lens element, and
   the tilted dichroic filter is configured to reflect wave-
   lengths of the image light outside of the wavelength
   range towards the absorbing mask via the intersecting
   partial reflectors.

\* \* \* \* \*